US007069354B2

(12) United States Patent
Pooni et al.

(10) Patent No.: US 7,069,354 B2
(45) Date of Patent: Jun. 27, 2006

(54) METHOD AND APPARATUS FOR IDENTIFYING MULTIPLE PATHS TO A SCSI DEVICE USING A CALCULATED UNIQUE IDENTIFIER

(75) Inventors: Subramaniyam Pooni, Ventura, CA (US); Rajkumar Mangalore, Bangalore (IN); Vijay Srinath, Bangalore (IN); Vikram Krishnamurthy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 10/260,436

(22) Filed: Oct. 1, 2002

(65) Prior Publication Data

US 2004/0064594 A1   Apr. 1, 2004

(51) Int. Cl.
*G06F 3/00* (2006.01)
*G06F 13/00* (2006.01)

(52) U.S. Cl. .................. 710/38; 710/1; 710/9; 710/33; 710/72; 710/74; 710/301; 710/316; 714/2; 709/201; 709/203

(58) Field of Classification Search .............. 710/1, 710/33, 38, 72, 74, 301, 316, 9; 714/2; 709/201, 709/203

See application file for complete search history.

(56) References Cited

U.S. PATENT DOCUMENTS 6,779,064 B1 *   8/2004   McGowen et al. ......... 710/104
2003/0177168 A1 *   9/2003   Heitman et al. ............ 709/201
2003/0200477 A1 *  10/2003   Ayres .......................... 714/2

* cited by examiner

*Primary Examiner*—Tammara Peyton

(57) ABSTRACT

The method includes querying for one or more logical unit numbers (LUNs) pertaining to a small computer system interface device, each LUN representing a potential path from a host to the SCSI device. Response data indicative of multiple LUNs to the single SCSI device is treated as separate instances of independent SCSI devices, with each separate instance representing a different SCSI separate instances of independent SCSI devices, with each separate instance representing a different SCSI device structure. A unique identifier (UID) is calculated for each SCSI device structure, from which a device file is generated based on the UID and contains UID and path information that differentiates between multiple paths from the host to the SCSI device.

28 Claims, 4 Drawing Sheets

METHOD AND APPARATUS FOR IDENTIFYING MULTIPLE PATHS TO A SCSI DEVICE USING A CALCULATED UNIQUE IDENTIFIER

BACKGROUND

In a Linux or UNIX operating system (OS), everything that accepts or sends data to or from the OS is considered to be a device. Common SCSI devices include terminals, hard disks, printers, CD drives, and modems. A rule of thumb is that anything used for input, storage, or handling of data in an OS is considered a device and needs a device entry so that it may be detected by the OS.

Each of these devices may also be SCSI devices. SCSI (small computer system interface) is a family of standards that connects components via a parallel bus for system-level interfacing between a computer and intelligent devices such as hard disks, floppy disks, CD ROMs, printers, scanners and other types of media devices or storage devices. SCSI can connect multiple devices to a single adaptor (e.g., a host bus adapter (HBA) or port) on a SCSI bus. SCSI devices transfer bits in parallel and can operate in either asynchronous or synchronous modes.

All devices communicate in one of two ways; either one character at a time, or as a complete set of data in a predefined block. Therefore, SCSI devices can be classified as being either "character mode" or "block mode". Terminals, printers, and modems are character devices since they handle data one character at a time. Hard drives and tape drives use blocks to transmit data as large chunks of information so they are block mode devices. Some SCSI devices function in either mode using two different device drivers.

A device driver is a software module that is part of the kernel and that supports access to a peripheral SCSI device. For example, in a Linux OS, when a SCSI device needs to be accessed, the Linux kernel passes the I/O request to the device driver, which handles the communication with the SCSI device. Special device files are used to access the SCSI devices which are connected to a Linux system such as printers, tape drives, terminals and disk drives that are used to store file systems. Special device files (hereafter device files) are kept in what is called a /dev directory and are given device file names representative of their function, such as "/dev/fd0" for a floppy drive, for example.

SCSI devices are identified by a device number. Device numbers allow the operating system to differentiate between the SCSI devices. The device number is constructed from a major number and a minor device number. In a standard Linux implementation, each SCSI device is assigned a major number and a minor number. The major number identifies the type of SCSI device (really the device driver), while the minor number represents an instance of a SCSI device of the type specified by the major device number. For example, the device file name "/dev/fd0" identifies the first floppy drive on a system, with "fd" representing the major number, and "0" representing the minor number of the device file name. The major number in Linux is a number ranging from 0 to 255 that identifies the SCSI device type. The minor number is also a number ranging from 0 to 255 which specifies a specific SCSI device among a group of SCSI devices that share the major number.

SCSI devices and device drivers having been briefly introduced, a discussion of the Linux SCSI I/O Subsystem including driver architecture, SCSI device addressing within the Linux SCSI I/O Subsystem and initialization of the Linux SCSI I/O Subsystem is provided, in order to further describe a background context for the invention.

Linux SCSI I/O Subsystem

The Linux SCSI I/O subsystem is made up of two basic elements, each of which may be represented by data structures. The first basic element is a SCSI host. A SCSI host is a physical piece of hardware, such as a SCSI controller or HBA. If a Linux host has more than one SCSI controller of the same type, each instance will be represented by a separate SCSI host. This means that a device driver may control more than one instance of its controller. SCSI hosts are almost always the "initiator" of SCSI commands, thus a SCSI host may be termed a SCSI initiator device, with the host controller or HBA being an "initiator". A scsi_host data structure is used to describe each instance of a host adapter (HBA) on the Linux system. The second basic element within the Linux SCSI I/O subsystem is a SCSI device. As discussed above, there are several types of SCSI devices: disk devices, tape devices, CD-ROM devices and generic devices. The different disk types have different major device numbers, allowing Linux to direct block device requests to the appropriate SCSI device type. A scsi_device_structure is a data structure that is used to describe a single SCSI device. There will be a single instance of the structure allocated for each physical SCSI device that is detected. Any SCSI device (such as a CD changer) that responds to multiple LUNs (logical unit numbers, a type of identifier discussed further below) will be treated as separate instances of independent SCSI devices. The scsi_host and scsi_device_structure(s), which are objects, are allocated at the time the SCSI bus is scanned by a mid-level SCSI layer. Objects, as are known in the computer literature, represent architectural abstractions or containers that encapsulate data types, data structures, services or other objects that are related in some way.

Driver Architecture Overview.

FIG. 1 illustrates a driver architecture for the Linux SCSI I/O Subsystem. The Linux SCSI I/O subsystem (hereinafter SCSI subsystem 1000) has a three (3) level driver architecture with the "upper" level layer 100 being closest to a user space/kernel space interface 110, while the "lower" level layer 150 is closest to hardware (e.g., physical SCSI device, not shown). As will be explained further below, the upper level drivers (ULDs) in upper level 100 are commonly known by a terse two letter abbreviation (e.g. "sd" for SCSI disk driver). The names of the corresponding module drivers which, for historical reasons, sometimes differ from the built-in driver names are shown in brackets in FIG. 1.

The ULDs in upper level layer 100 maintain the kernel side of the Linux OS's user-kernel interface for the logical class of SCSI devices they represent (e.g. disks). They are also responsible for managing certain kernel and SCSI subsystem 1000 resources such as kernel memory and SCSI command structures. Applications in the user space access these ULDs by opening a device file (block or char) typically found in the /dev directory tree.

Accordingly, the upper level layer 100 supports the kernel/user interface. For example, in the case of sd (disk) drivers and sr (CD-ROM) drivers, the kernel/user interface is a block device interface, while for st (tape) drivers and sg (generic) drivers, the kernel/user interface is a character device interface. Any operation using the SCSI subsystem 1000 (e.g. reading a sector from a disk) involves one driver at each of the 3 levels, e.g. sd drivers at upper level 100, SCSI mid-level driver at SCSI mid level layer 125 and an HBA driver of lower level layer 150.

The mid-level SCSI layer 125 is common to all operations. The mid-level SCSI layer 125 defines internal interfaces and provides common services to the upper and lower level drivers. IOCTLs (input/output control commands) provided by the mid-level SCSI 125 layer are available to file descriptors belonging to any of the four ULDs (sd, sr, st, sg device drivers).

The most common operation on a block SCSI device is to "mount" a file system. For an sd device, typically only a partition is mounted (e.g. mount—t ext2 /dev/sda6/ home). For an sr device, usually the whole device is mounted (e.g. mount—t iso9660 /dev/sr0/mnt/cdrom). A dd command can be used to read or write from block SCSI devices. In this case the block size argument ("bs") needs to be set to the block size of the device (e.g. 512 bytes for most disks) or an integral multiple of that device block size (e.g. 8192 bytes). A recent addition to the block subsystem allows a SCSI device (or partition) to be mounted more than once, at different mount points.

Sd is a member of the generic disk family, as is the hd device from the IDE (Integrated Device Electronics, a mass storage device interface standard) subsystem. Apart from mounting sd devices, an fdisk command is available to view or modify a disk's partition table. Sr is a member of the CD-ROM subsystem. Apart from mounting file systems (e.g. iso9660), audio CDs can also be read. The latter action does not involve mounting a file system, but typically involves invoking some IOCTLs. St is a char device for reading and writing tapes. Sg is a SCSI command pass through device that uses a char device interface.

SCSI Addressing.

Linux has a four level hierarchical addressing scheme for SCSI devices: (a) SCSI adapter number [host]; (b) channel number [bus]; (c) ID number [target]; and (d) LUN [lun]. The term "LUN" is a common SCSI abbreviation of Logical Unit Number. The LUN identifies the logical unit within a SCSI target device. A SCSI target device is a SCSI device containing logical units that service commands from a SCSI initiator device in order to carry out a specified task for example. As is known, a logical unit may be defined as addressable blocks of storage created from one or more disks (also called spindles) contained within a SCSI device. A logical unit may provide a unique connection to an application program or another SCSI device. "Bus" is used herein in preference to "channel" in the description below.

The SCSI adapter number is typically an arbitrary numbering of adapter cards on internal I/O SCSI buses (e.g. PCI, PCMCIA, ISA, etc.) of a computer (Linux host) running the Linux OS. Such adapters are commonly referred to as host bus adapters (HBAs) or "SCSI hosts". HBA numbers are issued by the Linux kernel in ascending order, starting with 0. Each HBA may control one of more SCSI buses.

Each SCSI bus can have multiple SCSI devices connected to it. In SCSI parlance, the HBA may be called the "initiator" (e.g., it may be an HBA of a SCSI initiator device) and takes up one SCSI ID number (typically the number "7"). The initiator talks to targets, commonly also known as SCSI target devices (e.g. disks), as briefly discussed above.

On SCSI parallel buses, the number of SCSI IDs are related to the width of the bus. For example, 8-bit buses (sometimes called "narrow" SCSI buses) may have 8 SCSI IDs, of which one ID is taken by the HBA, leaving 7 IDs for SCSI devices. Wide SCSI buses are 16 bits wide and can have a maximum of 15 SCSI devices (e.g., targets) attached. The SCSI-3 draft standard allows a large number of IDs to be present on a SCSI bus, with each SCSI device adapted to contain multiple (LUNs). These multiple LUNs are typically used by sophisticated tape and CD-ROM units that support multiple media. Accordingly, Linux's flavor of SCSI addressing is a four level hierarchy: <scsi(_adapter_number), channel, id, lun>, which is most commonly known with <host, bus, target, lun> encoding, i.e., (h0b0t0l0). Thus, a path from a SCSI host to a SCSI device, or to a logical unit represented by a LUN on a SCSI device, can be determined from the <host, bus, target, lun> or (h, b, t, l) address of a logical unit.

Storage area networking is predicated on the replacement of parallel SCSI transport with networked storage SCSI devices and tape SCSI devices behind the server or Linux Host. The vast majority of storage area networks (SANs) use a Fibre Channel (FC) medium for the underlying network transport and, at the upper layer, move data to and from disks with serial SCSI protocol, as described in the current draft SCSI Primary Commands-3 (SPC-3) document. The latest version of the SPC-3 document, found at ftp://ftp.t10.org/t10/drafts/spc3/spc3rO9.pdf, provides SCSI primary command standards that are designed to be used industry wide. The combination of a high-speed transport (FC) with native SCSI protocol results in an efficient means to deploy servers, disk arrays, and tape subsystems and frees all components from the constraints of parallel SCSI architecture.

The SCSI-3 device driver supplied by the HBA vendor is responsible for mapping FC storage resources to the bus, target, lun conventions required by Linux. Since FC addresses are self configuring, the mapping between port addresses, (which may change) and the upper level SCSI device driver designations are maintained by the HBA and the HBA's device driver interface to Linux.

Initializing the SCSI Subsystem

FIG. 2 is a sequence diagram according to unified modeling language (UML) principles that describes initializing a Linux SCSI I/O Subsystem ("SCSI subsystem") in order to detect one or more SCSI devices. FIG. 2 is provided in order to illustrate how device driver generated device file names are created by the standard Linux (and UNIX) implementations. FIG. 2 is also intended to illustrate that in standard Linux (and UNIX), there is currently no mechanism or method, in standard Linux, by which device driver-generated device file names may be used to determine multiple, physical (communication) paths, also called SCSI paths, from a Linux host consisting of multiple HBA adapter cards (also know simply as HBAs or SCSI hosts) connected to a single SCSI device (SCSI target device) or single logical unit within a SCSI target device.

Sequence 200 in FIG. 2 depicts the various interactions between a mid-level SCSI driver 102, an HBA driver 104, a SCSI device (e.g., SCSI device) 106, SCSI device drivers 108 (e.g., ULDs sd, st, sr, sg), a Linux kernel 110 and a file system 112. SCSI device 106 may represent one or a plurality of SCSI devices, more particularly one or more logical units (represented by their LUNs) on a SCSI device.

An initial assumption to be made is that for the Linux host to recognize any newly added SCSI devices connected to the host, the Linux host needs to be rebooted. This is shown in FIG. 2 When a new SCSI device is connected to a Linux host, a re-boot of the Linux host needs to be initiated by a user of the Linux host. This is shown in FIG. 2 by an asynchronous procedure call (202) to the Linux Subsyteem. During the reboot, kernel 110 makes a synchronous procedure call 204 (depicted by solid two-sided arrow) to mid-level SCSI driver 102, to initialize the SCSI subsystem. Mid-level SCSI has the job of running through all of the low-level drivers (HBA drivers 104) that were compiled into the system, and calling their detect( ) function to see if there are any physical adapter cards present in the system which any of the HBA drivers 104 can control.

In general, Linux finds out which of the SCSI hosts (HBAs), or controllers, that were built into the kernel 110 at kernel build time have hardware to control. Each built-in SCSI host has a scsi_host_template entry in what is called builtin_scsi_hosts vector. This vector is an array of all the adapter cards that the kernel 110 knows. A scsi_host_template data structure contains pointers to routines that carry out SCSI host specific actions such as detecting what SCSI devices are attached to this SCSI host. These routines (detect( ), release( ), ioctl( ), command( ), queuecommand( ), abort( ), reset( ), proc_info( ) etc.) are called by the SCSI Subsystem 1000 as it configures itself and they are part of the HBA driver 104 supporting this host type.

Referring to FIG. 2, the mid-level SCSI driver 102 has the job of running through all of the low-level HBAs that are built into the kernel 110 at time of reboot, and calls a detect( ) routine 206 (shown as a synchronous procedure call) to each HBA driver 104. This is done to see whether a HBA driver 104 has found adaptor cards, and hence an HBA. In other words, the detect entry point for an HBA driver 104 is called. For each HBA recognized (see return 208) by an HBA driver 104, a scsi_host data structure is created (see message 212). This is created for each newly detected HBA during the detect( ) routine by calling a function called scsi_register( ) in the mid-level scsi driver 102.

Information about the SCSI device drivers 108 (e.g., ULDs) are maintained in a scsi_device_template data structure. At kernel 110 bring-up time (e.g., during re-boot), a scsi_device_template for each known device drivers 108 is loaded (210) by the, kernel 110. This structure, among other things, contains pointers to the detect( ), init( ), attach( ), finish( ) and detach( ) functions, which are driver routines performed by SCSI device drivers 108. The scsi_device_template is used to describe a single type of device driver 108. In the current implementation of the SCSI subsystem, there is an absolute maximum of four (4) instances of this structure on any given system; one for sd driver, one for CD-ROMs (sr driver), one for tapes (st driver), and one for the generic pass-through devices (sg driver). If other driver types are added (e.g. scanner), a new scsi_device_template is created. A single physical SCSI device can be attached to more than one scsi_device_template (usually this is a generic driver, plus another device driver (e.g., an sd, sr, st driver). The mid-level SCSI driver 102 will eventually use the registered scsi_device_template of the SCSI device drivers 108 to invoke the SCSI device drivers 108, e.g., the scsi_device_template is called first to invoke certain driver functions or routines such as detect( ), attach( ), detach( ), finish( ), etc.

Each detected SCSI host for which there are real SCSI devices attached has its scsi_host template data structure added to a scsi_hosts list of active SCSI hosts. Each instance of a detected host type is represented by a scsi_host data structure held in the scsi_hostlist list. For example, a system with two PCI SCSI controllers would have two scsi_host entries in the list, one per controller. Each scsi_host points at the scsi_host_template representing its SCSI device driver 108.

Turning now to FIG. 2, for each HBA driver 104 that recognizes an HBA (SCSI host), the mid-level SCSI driver 102 adds, by internal function 212, the HBA driver 104's Scsi Host data structure (as mentioned above), which are stored in internal memory, to a scsi_hosts list of active SCSI hosts. For each recognized HBA instance, a Scsi_host list data structure is created by internal function 214.

B. Discovering SCSI Devices.

Now that every SCSI host (HBA) has been discovered, the SCSI subsystem 1000 must find out what SCSI devices are attached to each host's bus. SCSI devices are numbered between 0 and 7 inclusively, each SCSI device's number or SCSI identifier being unique on the SCSI bus to which it is attached. SCSI identifiers are usually set by jumpers on the SCSI device. This is done in a bus scan.

A bus scan is where commands are sent out to each SCSI host (HBA) on the system to inquire as to what SCSI devices, if any, are present on each bus. The general theory is simple: loop over all SCSI ID's, over all of the channels, and see what SCSI devices 106 are out there connected to the system. This is done by sending a SCSI command TEST_UNIT_READY.

Referring to FIG. 2, mid-level SCSI driver 102 makes a procedure call to SCSI devices 106. This is done by first sending TEST_UNIT_READY (TUR) command 216. Any response (see return 218) which indicates the presence of an actual SCSI device 106 is taken as an affirmative by mid-level SCSI driver 102. Another procedure call is made to discovered SCSI devices 106. When a SCSI device 106 responds, its identification is read by sending it a command. This is a SCSI INQUIRY command 220, that requests certain identifying data from SCSI device 106 (which could be a single LUN type of SCSI device or component logical units, i.e., a multiple LUNs type of SCSI device). The identifying data is sent to the mid-level SCSI driver 102.

For each SCSI device 106 that responds, the retrieved information is used in order to create (222) a scsi_device data structure that points to the scsi_host. A scsi_device data structure is a data structure that includes host#, bus#, target# (SCSI ID), and LUN fields, (e.g., the h,b,t,l address) to a SCSI device 106, such as a LUN (logical unit). The scsi_device data structure may also include fields which gives Linux the vendors name, the SCSI device's model name and any revision names, for example. The scsi_device data structure has a corresponding SCSI device pointer (SDP) which points to the scsi_host. There is a SDP for each SCSI device. The SDP contains fields which reference an h,b,t,l of the scsi_device data structure and hence a SCSI device.

Additionally for each discovered SCSI device 106, mid-level SCSI driver 102 makes a procedure call to see what ULDs might be willing to drive the SCSI device 106. For example, more than one device driver 108 (e.g., an sd and sg driver, or st and sg driver) may each want to "claim" a discovered SCSI device 106. This is accomplished by calling the detect 0 entry point (224) for all of the registered ULDs using the scsi_device_template structure for each SCSI device driver (e.g., registered at 210). In FIG. 2, there is a box 226 that encompasses calls/functions 202–224. This indicates that a looping function is performed, e.g., these steps are repeated for each HBA built into kernel 110.

C. Calling SCSI device Driver Routines.

SCSI commands (e.g., a SCSI INQUIRY command) are represented by a scsi_cmnd data structure and are passed to the device driver 108 by calling device driver routines within its scsi_host_template data structure. Every SCSI device 106 that is found is represented by a scsi_device_structure, each of which points to its parent scsi_host. All of the scsi_device_structure(s) are added to a scsi_devices list.

Each "SCSI type" is represented by a $scsi_{13}$ type_template data structure. This contains information about this type of SCSI device and the addresses of routines to perform various tasks. The SCSI subsystem uses these templates to call various SCSI type device driver routines (detect( ), init( ), finish( ), attach( ), detach( ) etc.) for each type of SCSI device 106.

For example; an init( ) entry point routine (228) is called for all UIDs (SCSI device drivers 108) for initialization; this will allocate internal data structures. For all discovered SCSI devices 106, an attach( ) entry point routine (232) is called to insert a pointer to the scsi_device data structure of each discovered SCSI device 106 (again, loop 216) into the internal tables of the UID (SCSI device driver 108). In other words, if the SCSI subsystem wishes to attach a SCSI disk device, it will call the SCSI disk type attach routine. The scsi_type_template data structures are added 236 (to the scsi_device_list) if one or more SCSI devices 106 of that type have been detected. Block 234 indicates that calling of the attach( ) routine is repeated for all discovered SCSI devices 106.

The final phase of the SCSI subsystem initialization is to call finish( ) routines 238 for each registered scsi_device_template. For the SCSI disk type (sd), this routine spins up all of the SCSI disks that were found and then records their disk geometry. It also adds the gendisk data structure (not shown) representing all SCSI disks to a linked list of disks. Once Linux has initialized the SCSI subsystem, the SCSI devices 106 may be accessed.

In order to access SCSI devices 106, e.g., through device driver-generated device file names in file system 112, which are required in order to talk to a SCSI device 106, device nodes need to be created for the SCSI devices 106. These device nodes need to be created by a system administrator on the Linux host, for example. In Linux a MAKEDEV utility 114 creates all these device nodes for various device drivers 108. As is known, MAKEDEV is a user mode utility run from boot-up scripts.

The MAKEDEV utility generates (see message 240) all device files required to talk to a SCSI device 106. However, it creates entries for a list of all conceivable SCSI devices in file system 112 (call a /dev/ directory), most of which may not be actually be present in the system. This means that the /dev/ directory does not truly represent what SCSI devices 106 are actually connected to the system.

In standard Linux (and also in UNIX), there is no way to determine multiple paths to the same logical unit (LUN) of a SCSI device 106 using the device driver generated device file names. Moreover, a SCSI host may have several physical paths (SCSI paths) to a single logical unit, as represented by its LUN) on a SCSI device.

Each physical path to a SCSI device 106 (or to a LUN behind a logical unit 106) results in a separate device file name. Most of the device driver-generated device file names (e.g., /dev/sda, /dev/sg1, etc.) have h,b,t,l mapping in them, as they are associated with a minor number. So it is possible that a user (e.g., application in the user space) by mistake can mount two different device files pertaining to the multiple paths to the same SCSI device. For example, since the SCSI disk device is a block device, attempting to mount multiple device files on a single SCSI disk device could lead to a file system corruption. In a SAN configuration, which contains an enormous amount of SCSI devices (and hence a large number of device files), the probability of such a corruption is too high.

Currently, fault tolerant drivers, which try to avoid a single point of failure, such as by using multiple HBA's on each Linux Host, for example, normally mark one of the multiple paths to a SCSI device as active. All the other paths to the same SCSI device are marked as passive. Whenever there is a problem, the driver attempts to "fail over" from the active path to one of the passive paths . So, fault tolerant drivers need an effective way to identify the multiple physical SCSI paths to the same SCSI device. What is needed is a mechanism or technique to make it possible to detect multiple physical SCSI paths to the same SCSI device or logical unit.

SUMMARY OF THE INVENTION

A method and apparatus for identifying multiple paths to a SCSI device is described. The method includes querying for one or more logical unit numbers (LUNs) pertaining to a small computer system interface device, each LUN representing a potential path from a host to the SCSI device. Response data indicative of multiple LUNs to the single SCSI device is treated as separate instances of independent SCSI devices, with each separate instance representing a different SCSI device structure. A unique identifier (UID) is calculated for each SCSI device structure, from which a device file is generated. The device file is generated based on the UID and contains UID and path information that differentiates between multiple paths from the host to the SCSI device.

BRIEF DESCRIPTION OF THE DRAWINGS

The present invention will become more fully understood from the detailed description given here and below and the accompanying drawings which are given by way of illustration only, and thus are not limitative of the present invention, and wherein.

DETAILED DESCRIPTION

Figure 3:
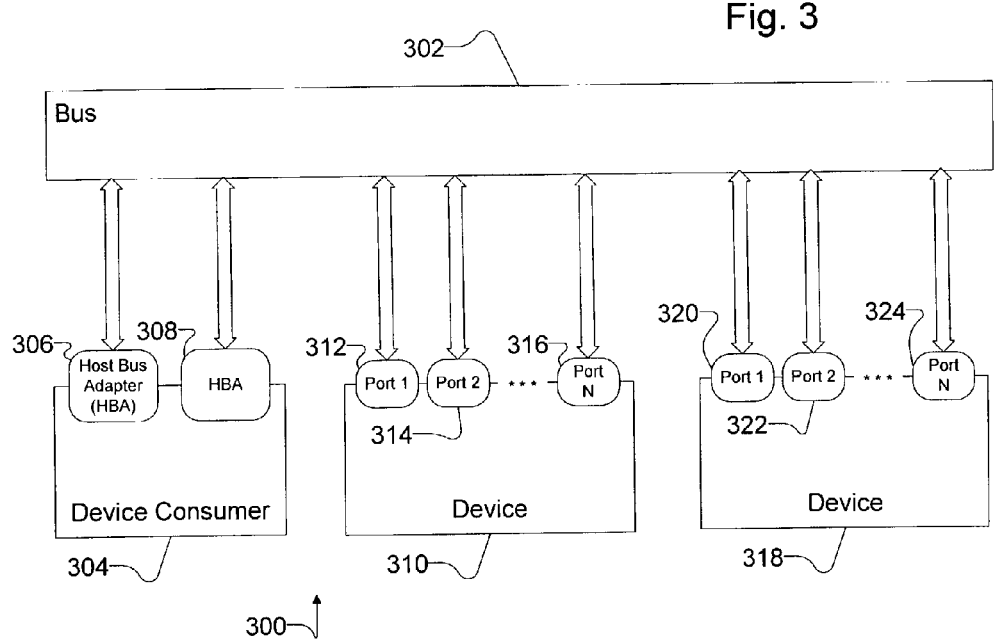
FIG. 3 depicts a hardware block diagram of a system 300 according to an exemplary embodiment of the invention.

FIG. 3 depicts a hardware block diagram of a system 300 according to an embodiment of the invention. The system 300 includes a bus (e.g., SCSI, fibre channel, etc.) 302 to which are connected a consumer of device services (hereafter a device consumer) 304, a device 310 and a device 318. Device consumer 304 may also be referred to as a SCSI host or SCSI initiator SCSI device and SCSI devices 310 and 318 may be referred to as SCSI target SCSI devices.

The device consumer 304 includes host bus adapters (HBAs) 306 and 308 that permit the device consumer 304 to connect to and interact with the bus 302. The device 310 has port 1 (312), port 2 (314), . . . port N (316). Device 318 has port 1 (320), port 2 (322), . . . port N (324). For simplicity of disclosure, only two devices 310 and 318 and two HBA's 306 and 308 have been depicted, but fewer or greater devices could be attached to the bus depending upon the particular circumstances of a situation.

Figure 4:
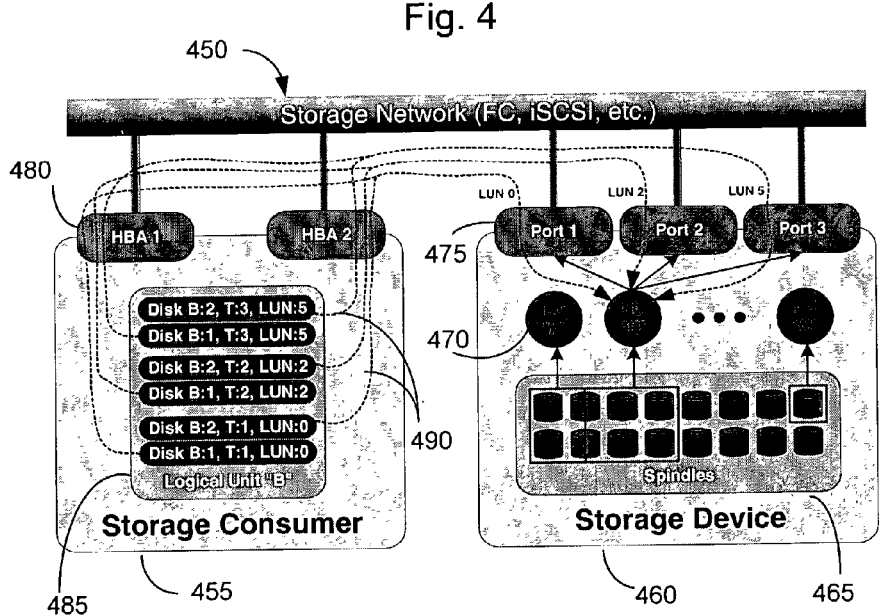
FIG. 4 depicts a hardware block diagram corresponding to a particular type of system 300.

FIG. 4 depicts a hardware block diagram corresponding to a particular type of system 300, namely a storage area system or storage area network (SAN) 450. SAN 450 consists of a single storage consumer 455 (e.g., a host bus, a host computer, server, etc e.g. "host".) and a storage device 460 (e.g., RAID array, etc.); however, the present invention is envisioned for storage networks of any size and any number of storage consumers/storage devices. Storage consumer 455 may represent a SCSI initiator device, and storage device 460 may represent a SCSI target device. The devices described in SAN 450 may also be embodied as a SCSI bus or a fibre channel (FC) fabric (e.g. frame switching network or arbitrated loop), for example.

Storage device 460 may contain a number of disk spindles 465 (or some type of storage medium such as flash RAM, tape, etc.) that the storage device 460 uses to persistently store data for consumers of the storage device (e.g., storage consumer 455). Storage device 460 publish internal storage to consumers by creating logical units 470 of storage using various methods that match with the storage consumer 455's needs. For example, logical units 470 may be stripped across multiple spindles 465 to improve throughput, logical units 470 may be mirrored across multiple spindles 465 for data resiliency.

FIG. 4 shows three such logical units 470, labeled LU "A", "B", and "C" that are constructed from some number of disk spindles 465. One or more storage consumers 455 may access a particular LU by communicating requests to a port 475 on storage device 460 and tagging the request with a port relative address, this is the logical unit number or LUN. In FIG. 4, LU B may be mapped out of three different ports 475 (e.g., SCSI target ports or target ports) by the storage device 460.

If consumer 455 wants to use LU B (e.g., to access data contained in the logical unit which ultimately resides on one or more of the spindles 465) consumer 455 may access LU B by sending requests to Port 1 tagged with LUN 0, to Port 2 using LUN 2, or to Port 3 using LUN 5. This is an example of a storage device providing multiple paths to the same LU, which may be done for fault tolerance and/or improved bandwidth. Consumers of storage (hosts) can also have multiple connections into a SAN for the same reasons. Accordingly, in FIG. 4, storage consumer 455 represents a single host that has two connections to SAN 450, via Host Bus Adapters 480 (HBA "1" & HBA "2"; these are synonymous to SCSI initiator ports).

The dotted lines in FIG. 4 represent the various SCSI paths 490 from the host consumer 455 through SAN 450 to LU B. From the perspective of the host consumer 455, each SCSI path 490 appears to consumer 455 as an unrelated block of storage. Internally, the consumer 455's operating system (OS) will create named objects to represent the blocks of storage the OS discovered (represented as "Disk B:# T:# LUN:#", analogous to the h,b,t,l path). In FIG. 4, the "host" (consumer 455) has six paths to LU B and has created six different OS objects that ultimately point to the same logical unit of storage. Block 485 denotes the fact that the contained named objects are all related to the exact same logical unit, in this example LU B; however storage consumer 455, without additional logic, cannot nominally discover this relationship. This can result in multiple instances of the same file system being mounted on the Linux host, each with its own local independent cache. This cache can easily result in file system and/or data corruption because of the uncoordinated access to the logical unit.

Figure 5:
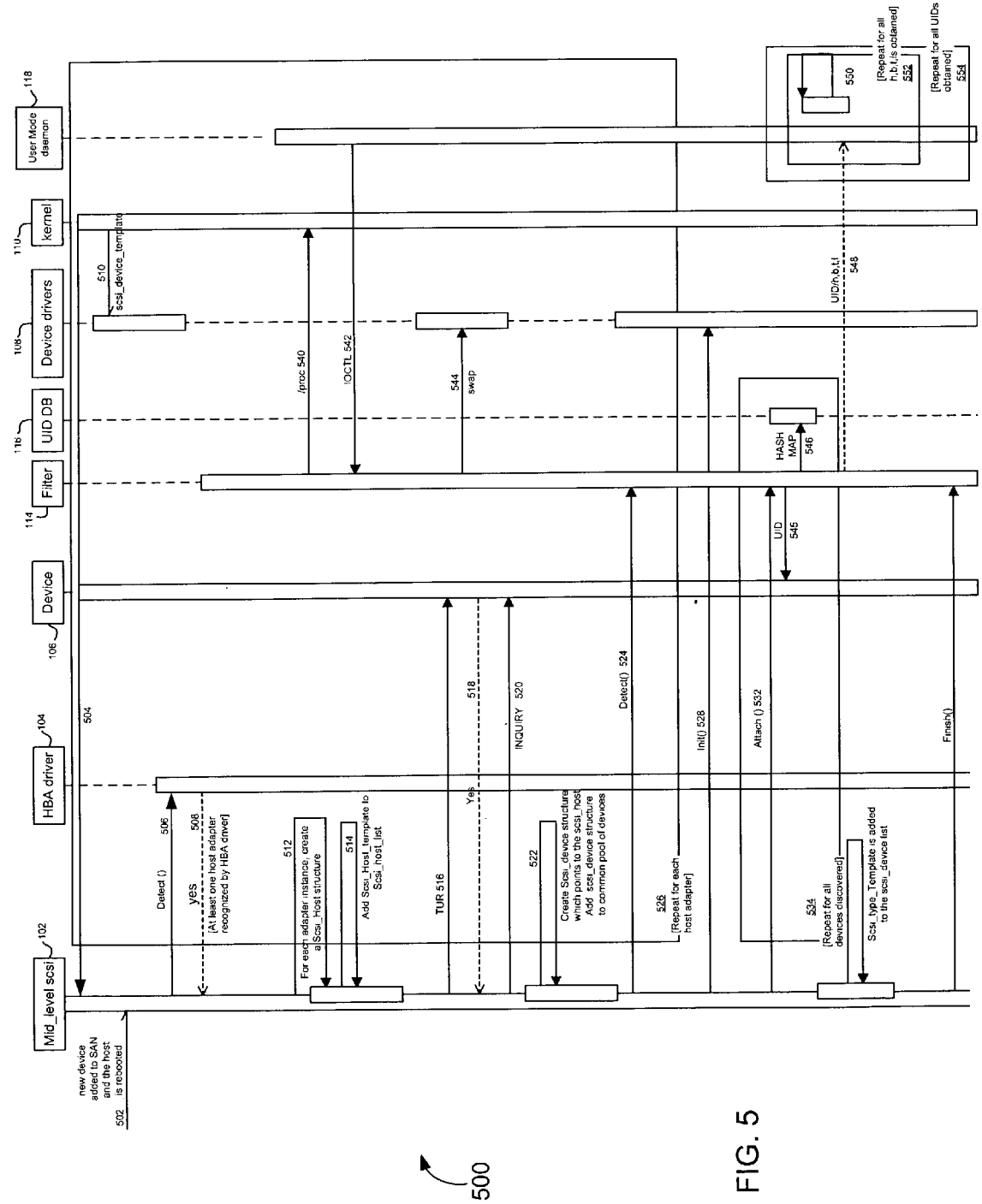
FIG. 5 is a sequence diagram illustrating a method of identifying multiple paths to a single SCSI device in accordance with an exemplary embodiment of the invention.
Figure 3:
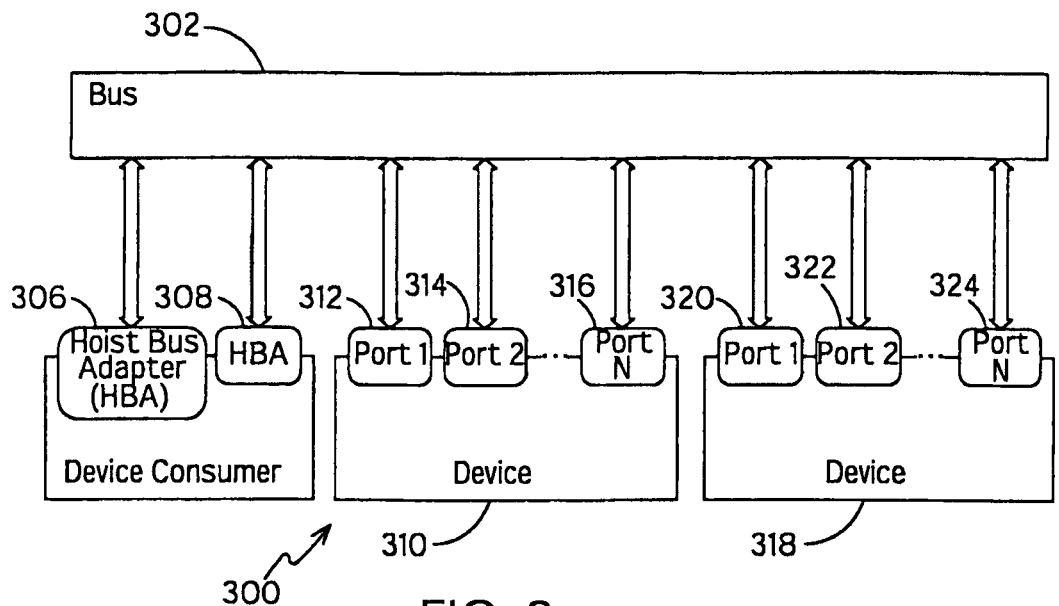
Figure 4:
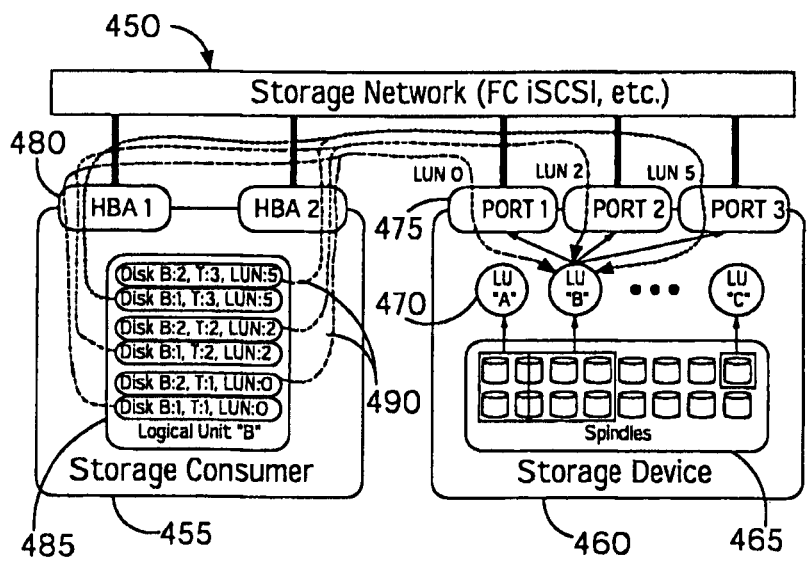

FIG. 5 is a sequence diagram illustrating a method of identifying multiple paths to a single device in accordance with an exemplary embodiment of the invention. Similar to FIG. 2, the sequence 500 in FIG. 5 depicts various interactions between a mid-level SCSI driver 102, an HBA driver 104, a device (e.g., SCSI device) 106, device drivers (e.g., ULDs) 108 and Linux kernel 110. However, in FIG. 5, a filter driver 114, a unique logical unit identifier database (UID DB) 116 and a user mode daemon 118 are introduced.

As used herein, "device 106" may refer to a SCSI device and may also be referred to in terms of a logical unit and/or a LUN which refers to a logical unit on a physical SCSI device such as a storage device.

In accordance with the method and apparatus of the present invention, and as will be explained in further detail below, a filter driver 114 which is a kernel component that runs in the kernel space of the Linux OS, is inserted as a module between the upper level disk drivers (device drivers 108) and the mid-level SCSI driver 102 in the SCSI subsystem. The filter driver 114, in kernel space, will be used to create a filter-specific device file name, in user space, that may be used to differentiate all multiple paths to a single discovered device 106, such as to a single logical unit.

In general, filter driver 114 creates an entry point (/proc entry) for itself in a /proc file system of kernel 110 so that IOCTLs may be directed from a user mode daemon 118 to the filter. The filter driver 114 will end up receiving the calls directed towards the device drivers 108, (e.g., ULDs such as sd, sr, st, sg) by swapping detect, attach, finish and detach routines of the device drivers 108 with its own detect, attach, finish and detect routines. Thus, the filter driver 114 is called, instead of device drivers 108, for "claiming" a device 106, which in a preferred embodiment may be a logical unit (represented by a LUN). For example, when the mid-level SCSI driver 102 calls the ULDs (device drivers 108) attach( ) routine through the scsi_device_template structure, the filter driver's 114 attach( ) routine gets called instead, since the filter driver 114, by virtue of swapping, intercepts the call.

The filter driver 114 maintains a local copy of each scsi device pointer (SDP) that represents or pertains to a newly discovered SCSI device 106. Each newly discovered SCSI device 106 may be embodied as a LUN of a logical unit, for example. The SDP is passed as a parameter to the attach routine.

Accordingly, each newly discovered SCSI device 106 has an associated SDP which refers to a scsi_device data structure that describes the SCSI device 106. Any device (such as a CD changer) that responds to multiple LUNs will be treated a separate instances of independent devices. These scsi_device structure (s) are allocated at the time the bus is scanned.

In an aspect of the invention, the filter driver 114 queries the SCSI device 106 (e.g., a LUN) for identifier information, and generates a unique logical unit identifier (UID), which also may be known as a RUID. The filter driver 114 builds what is called a "UID-to-SDP hash map" in kernel 110 memory with the generated UID being used as the hash "key" to an SDP. The hash map is in UID DB 116, and may be referenced by the filter driver 114 to assist in building filter driver-specific device file names, also known as UID-based or RUID-based device file names. These are built in user space by the user-mode daemon 118. Accordingly, an application (such as one being run by user daemon 118 in the user space) may easily determine multiple paths to a single SCSI device (logical unit) from the filter-specific device file names.

Sequence 500 is similar to sequence 200, to a point. An initial assumption to be made is that for any newly added device to be visible to a Linux Host the host needs to be rebooted. During the reboot, kernel 110 makes a synchronous procedure call 504 (depicted by solid two-sided arrow) to mid-level SCSI driver 102.

The mid-level SCSI driver 102 has the job of running through all of the low-level HBAs (low-level drivers) that are built into the kernel, and calling the detect( ) routine (506) of each low-level, HBA driver 104. In return, HBA driver 104 calls (508) the mid-level SCSI to create a scsi_host structure for every host discovered. For each HBA driver 104 that recognizes an HBA, the mid-level SCSI driver 102 adds (512) the HBA driver 104's scsi_host_template , to a scsi_hosts list of active SCSI hosts. For each recognized HBA instance, a scsi_host structure is created (514).

Figure 1:
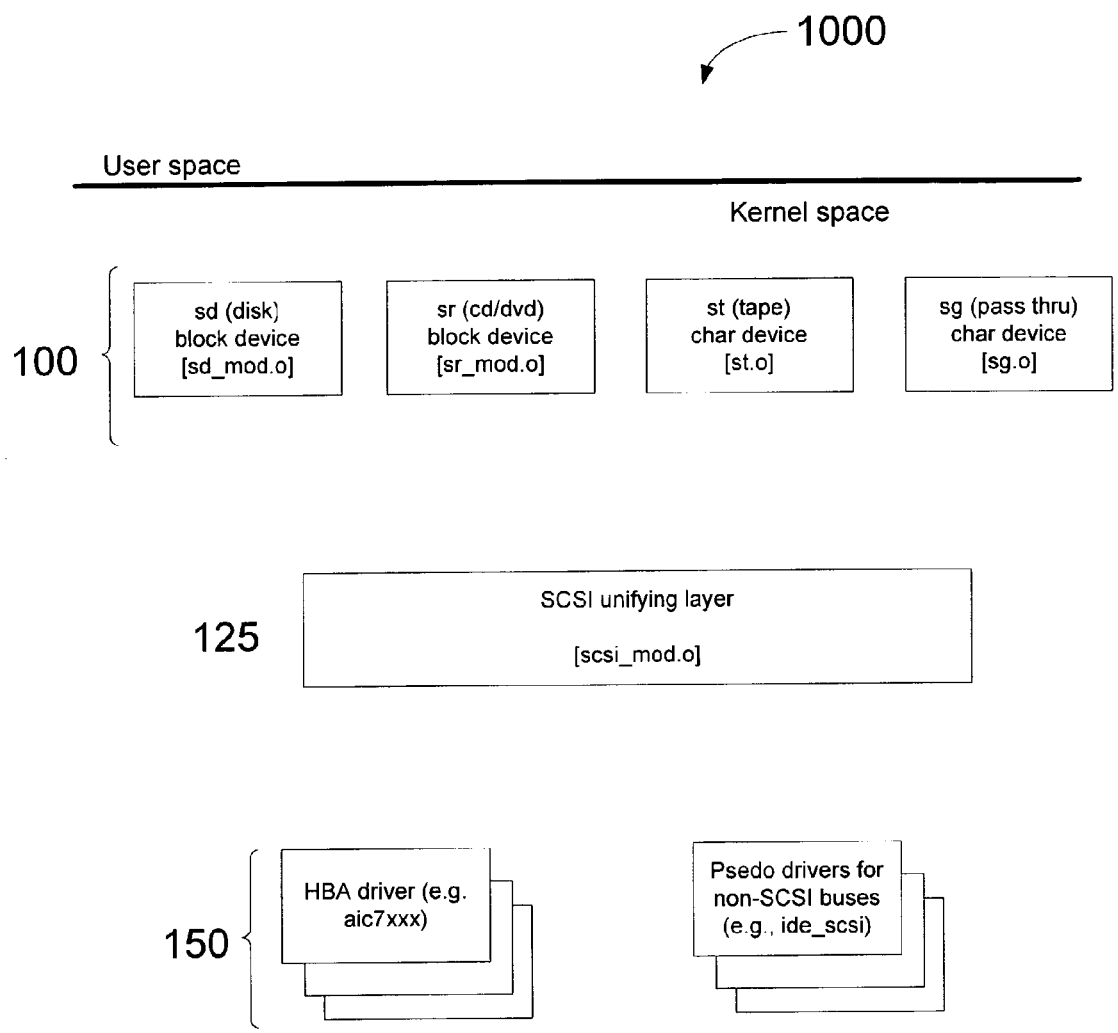
FIG. 1 illustrates a driver architecture for the Linux SCSI I/O Subsystem.
Figure 2:
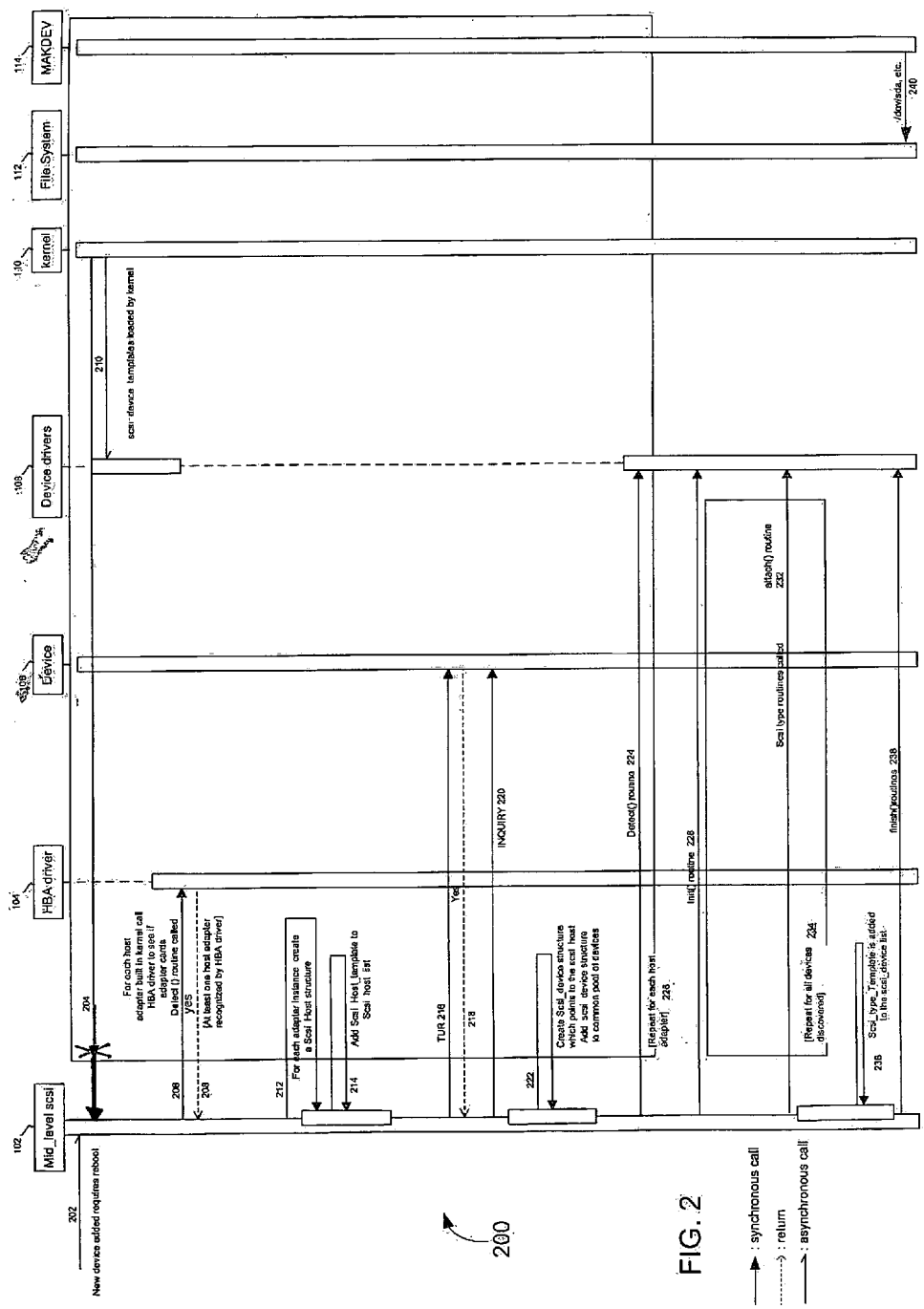
FIG. 2 is a sequence diagram according to unified modeling language (UML) principles that describes initializing the SCSI Subsystem 1000 in order to detect one or more SCSI devices.

As in FIG. 2, once every SCSI host (HBA) has been recognized, the SCSI subsystem determines what SCSI devices 106 are attached to each host's bus. Mid-level SCSI driver 102 sends a TUR command 516. Any response (518) indicates the presence of an actual SCSI device 106. Then a SCSI command 520 (an INQUIRY command, for example) that requests certain identifying data of device 106 (which, again, could be a single LUN type of SCSI device or component logical units, i.e., a multiple LUNs type of SCSI device) is sent to the device 106 from the mid-level SCSI driver 102.

For each device 106 that responds, the retrieved information is used in order to create (522) a scsi_device data structure that points to the scsi_host. The scsi_device data structure provides the vendor's name, the device's model name and any revision names. Additionally for each discovered device 106, mid-level SCSI driver 102 makes a procedure call (a detect ( ) routine 524) to see what ULDs might be willing to drive (e.g. to claim) device 106. Normally this call for a detect ( ) routine will go to all device drivers 108 (sd, st, sr, sg). However, in this embodiment, the detect 0 entry call 524 goes directly to a filter driver 114, which has been inserted between the mid-level SCSI driver 102 and the ULDs (e.g., device drivers 108), instead of to all the device drivers 108.

The filter driver 114 creates a /proc entry point 540 in kernel 110. In other words, it creates a point of communication between the user mode space and the kernel mode space for the user mode daemon 118 to send commands across to the kernel space. The user mode daemon 118, running in a user mode in user space, needs to establish some kind of communication mechanism with the filter driver 114, since the filter driver 114 runs in kernel mode in kernel space of the OS. The reason for this is because when a new device is seen by the mid-level scsi driver 102, the mid-level scsi driver 102 creates a SDP and calls the attach routine of the device drivers 108. This is intercepted by the filter driver 114, which performs a UID calculation for the given SDP. Thus, the filter driver 114 needs to communicate back to the user mode daemon 118, to inform user mode daemon 118 that one or more device files need to be created in the user space for a newly discovered device (e.g., device 106). The user mode daemon 118 does this by sending an IOCTL command 542. This command blocks (e.g., goes to sleep) until the filter driver 114—sees a newly discovered device 106. In other words, a filter thread of the filter driver 114 goes to sleep.

The filter driver 114 swaps (544) entry points for the driver routines. As discussed above, the SCSI subsystem uses scsi_device—templates to call various SCSI type driver routines (detect( ), init( ), finish( ), attach( ), detach( ) etc. ) for each type of SCSI device 106. By swapping its own diver routine entry points with the drivers' 108 routines (i.e., swapping detect( ), attach( ), detach( ), finish( ) entry points of the disk, tape, CD-ROM, generic device drivers with its own), the filter driver has control over all LUNs of a discovered device 106.

Specifically, the filter driver 114 looks where these entry points are stored in device drivers 108, saves a copy for itself, and then overwrites them with it's own detect( ) entry point. That way, the filter can claim everything, and then still ask the other upper layer drivers (device drivers 108) if one or more controls a particular LUN. So the difference between the present invention and the standard Linux implementation is that instead of the ULDs (device drivers' 108) detect( ) point being called directly at 524, the filter driver's detect( ) point is called first, and then the filter driver 114 calls an upper-layer driver's detect( ) routine.

Additionally as part of the detect( ) routine (524), the driver filter 114 increases the size of a vector rscsi_disks array. Linux has a limited capability of detecting newly added device due to the size of this vector array. The vector rscsi_disks array holds SDPs to SCSI devices in the device drivers 108, and is allocated at boot time of the Linux OS. The size of this vector array is typically fixed to equal the number of devices noticed during boot time, plus a small limited number of spare entries for newly added devices (for example, any device that is hot-plugged to the Linux host). Hence hot-plugging can be done for very few devices. However, since the filter driver 114 has been inserted, it is able to increase the size of the vector rscsi_disks array, so more "slots" are thereby created for any additional hot-plugged devices.

Similar to FIG. 2, an init( ) entry point routine is called (528) to allocate internal data structures (mainly arrays that are indexed by minor number). Finally, for all detected devices 106 an attach( ) entry point routine is called (532) called to insert the SDPs.

The filter driver 114 will end up receiving the calls directed towards the device drivers 108, (e.g., ULDs such as sd, sr, st, sg) by swapping the detect, attach, finish and detach routines of the ULD with its own detect, attach, finish and detect routines. So the filter driver 114 is called, instead of device drivers 108 for "claiming" a device 106, which in a preferred embodiment may be a logical unit (represented by a LUN). The mid level scsi 102 calls the device drivers' 108 (ULDs) attach( ) routine through the scsi_device_template structure. Instead of the ULDs attach( ) routine being called, the filter driver's 114 attach( ) routines gets called.

As discussed above, the filter driver 114 maintains a local copy of each (SDP) that represents or pertains to a newly discovered SCSI device 106. Each newly discovered SCSI device 106 may be embodied as a LUN of a logical unit, for example. The SDP is passed as a parameter to the attach routine.

To create a UID, the filter driver 114 takes each SDP, which refers to a LUN (logical unit) by the logical unit's h,b,t,l, address, and calculates a UID. All calculated UIDs are stored in UID DB 116. This is done so the filter driver 114 knows which h,b,t,l addresses point to the same UID. If the UID is the same at two different addresses, then the filter driver 114 knows that it has two paths to this logical unit.

The creation of a UID 545 by the filter driver 114 may be accomplished similar to as is described in co-pending U.S. Patent Application Serial No. (unassigned) to Erickson et al., entitled METHOD AND ARRANGEMENT FOR GENERATING UNIQUE IDENTIFIERS FOR SCSI LOGICAL UNITS, Attorney Docket No. 100204671-1, filed on Oct. 1, 2002, the contents of which are hereby incorporated by reference in their entirety.

For example, filter driver 114 may issue a SCSI command, such as a SCSI inquiry command 545 over the h,b,t,l to the device 106. The inquiry command requests that the device forward identifying data back to the filter driver 114. The inquiry command could contain a particular bit (e.g., a one-bit enable vital product bit (EVPB)) that requests a Device Identification Vital Product Data Page (VPD 83h) from the device 106. If the VPD 83h page is not supported, the inquiry command may include an EVPB bit to request a unit serial number VPD page (VPD 80h). Further, the inquiry command may query for a standard inquiry page payload. The standard inquiry page payload may include data related to vendor identification, product identification, product revision level of the logical unit (LUN) mapping to the h,b,t,l address at device 106. In other words, the data returned is dependent on what data is being queried for in the SCSI command.

For example, to generate or build the UID, the filter driver 114 may concatenate one or more of the vendor identification, product identification, product revision level, and peripheral device type fields from the standard inquiry page to identifier data found (and previously cached) in the VPD 83h page and/or VPD 80h page payload. The resultant identifier for the logical unit (LUN) (device 106) is a globally unique logical unit identifier (UID) that is independent of vendor, product, path and logical unit type.

To maintain a mapping from a SDP to its corresponding UID, a hostdata field in the scsi_device data structure is used. When an attach( ) function of filter driver 114 is invoked, and a UID is calculated for a discovered LUN (device 106), the UID is stored in UID DB 116 and also in the hostdata field of the scsi_device data structure. Thus, a UID for a device 106 may be determined merely by accessing the hostdata field in the scsi_device data structure of that device. In any case, the SDP-to-UID mappings within the hash table may provide both a UID and all h,b,t,l addresses (of one or more devices 106) that map to the UID.

The hash map in UID DB 116 is a map in kernel memory between a UID and the different SDPs pertaining to the same logical unit. Accordingly, for every LUN (device 106) that is discovered, a UID of the LUN is computed. As discussed above, a SDP is used to describe a single SCSI device. There will be a single instance of an SDP that is allocated for each discovered device 106. Any device that responds to multiple LUNs will be treated as separate instances of independent devices. This means that for every logical unit (LUN), there will be a corresponding scsi_device structure and its SDP.

The underlying data structure used to represent the hash map is a hash table. Each bucket (entry) in a hash table points to a SDP which contains the UID. The hash map includes a counter which keeps track of the multiple paths mapping to the same logical unit, and includes links to a list of SCSI devices that map to a single UID.

For example, any LUN that is seen by the disk driver or tape driver will also be seen by the generic driver but the converse does not always hold true. So in a typical case, there are at least two paths pointing to the same logical unit, one path corresponding to one of the class drivers (sd, st, sr) and the other corresponding to the sg driver.

To store the UID's, the filter driver 114 builds what is called a "UID-to-SDP hash map (see message 546), with the generated UID being used as the hash key to an SDP. The hash map is in UID DB 116, and may be referenced by the filter driver 114 to assist in building filter driver-specific device file names, also known as UID-based or RUID-based device file names. These are built in user space by the user-mode daemon 118.

Similar to FIG. 2, and also including the processes performed by filter driver 114 and user daemon 118 as represented at 524, 540, 542, and 544, functions or processes 504 through 524, 540, 542 and 544 are repeated for each recognized HBA, as indicated by box 526, which denotes a looping process. Similarly, processes 532, 545 and 546 are repeated for each discovered device 106, as indicated by block 534.

Now that the filter driver 114 knows which UIDs are at which h,b,t,l addresses, the filter driver 114 can give this information back to the user level daemon 118, which has been waiting for this information since the IOCTL at 542. Specifically, the filter wakes up the sleeping thread and returns (548) the UIDs of newly discovered devices 106 (LUNs) and all h,b,t,l addresses that map to a particular UID (from the hash table, which is stored in UID library 116). This information is returned in a buffer which the user process can copy and release.

Referring to the boxes 550, 552 and 554 in FIG. 5, these boxes describe a nested looping process that user mode daemon 118 performs in order to create driver-specific device file names in the user space, which also may be referred to as UID-based or RUID-based device file names. For each UID returned (box 550), for each h,b,t,l mapped to that UID (box 552), the user mode daemon 118 determines if existing device files (e.g., device driver generated device file names that are created by the standard Linux implementation) for the SCSI disk (sd), SCSI generic (sg), SCSI CD-ROM (sr) and SCSI tape (st) drivers match the h,b,t,l addresses sent by filter driver 114 to user mode daemon 118. If a match exists, then a filter-specific device file is created (550). The major number and minor number of the filter-specific device file device file will match the major number and the minor number of the existing standard device driver-generated device file, since the h,b,t,l of the standard device file was found to match the h,b,t,l of the UID.

Device File Name Conventions

For disk LUNs seen by a disk driver, UID-based device files are created in a format <COMPRESSED_UID>-<PATH_NO>-<PARTITION_NO>under a "/dev/trdisk" directory. This is a filter specific directory that is created and maintained in user space and may be accessed by a user application (such as a user mode daemon 118). The COMPRESSED_UID is the UID created for the logical unit (LUN). UIDs sometimes can be very lengthy, so as to exceed a maximum file name length limit. In order to obtain a shorter UID, the UID may be compressed using a well know run length limited (RLL) algorithm. PATH_NO differentiates between multiple paths to the same logical unit, and PARTITION_NO is a specific partition on the disk.

For generic LUNs seen by a generic driver, which includes disk LUNs and tape LUNs, a "/dev/trgen" directory that is created and maintained in user space and may be accessed by a user application, and which contains UID-based device files in the format <COMPRESSED_UID>-<PATH_NO>, where COMPRESSED_UID is the UID-based device name and PATH_NO differentiates between multiple paths to the same logical unit. There is no partition number for generic device listings because the concept of partitions does not exist for generic LUNs. When dealing with disks, generic device files always refer to the entire disk.

For tape LUNs seen by a tape driver, a "/dev/trtape" directory is created and maintained in user space and may be accessed by a user application. The /dev/trtape directory contains UID-based device files in the format [n]<COMPRESSED_UID>-<PATH_NO>[-<DEVICE_CHARACTERISTICS>] where n is present for tape LUNs with no-rewind functionality and n is absent for tape LUNs with rewind capability. COMPRESSED_UID is the UID-based device name, PATH_NO differentiates between multiple paths to the same logical unit, and DEVICE_CHARACTERISTICS pertains to characteristics of the tape LUN.

Accordingly, filter-specific disk device files created for disk LUNs seen by the disk driver should have the same characteristics as the standard /dev/sd[a-z] (e.g. format for name)and /dev/sd[a-z][a-z] disk driver device files. The filter-specific generic device files created for generic LUNs seen by the generic driver should have the same characteristics as the standard /dev/sg[0-255] generic driver device files. The filter-specific tape device files created for tape LUNs seen by the tape driver have the same characteristics as the standard /dev/st[0-32] and /dev/nst[0-32] tape driver device files.

EXAMPLE

In the following example, assume that one (1) UID, "123456789", and two h,b,t,l addresses (paths) for that UID, (0,1,0,2) and (0,3,4,2) were forwarded to the user mode daemon 118. The daemon 118 is going to ask the following to each existing, standard device file (these are /dev/sd[a-z]; /dev/sg[0-255]; /dev/st[0-32] and /dev/nst[0-32]):

(a) the device file's major number (this number tells the daemon 118 if the device file is a disk, generic, or tape device file);
(b) the device file's minor number; and
(c) what is the device file's (h,b,t,l)?

Taking actual device file names, assume that /dev/sg5 (SCSI generic major number, minor number 5) and /dev/sdaa (SCSI disk major number, minor number 0, one partition) both pointed to h,b,t,l address (0,1,0,2); and /dev/sg1 and /dev/sdba both pointed to (0,3,4,2). The process would leave those files there, and create, in addition to them, the following filter-specific device files:

/dev/trdisk/123456789_0_0 (uid_path_partition, same major/minor as /dev/sdaa)
/dev/trdisk/123456789_1_0 (same major/minor as /dev/sdba)
/dev/trgen/123456789_0 (no partitions for generic devices, same major/minor as /dev/sg5)
/dev/trgen/123456789_1 (same major/minor as /dev/sg1)

Accordingly, /dev/trdisk/123456789_0_0 and /dev/trgen/123456789_0 both talk to the same device through the same path (since the UID and device path numbers match). Further, /dev/trdisk/123456789_1_0 and /dev/trgen/123456789_1 also refer to the same device, but from two different paths (since only the UID values match). This relationship is not at all obvious with the original files (e.g., /dev/sg5 and /dev/sdaa; /dev/sg1 and /dev/sdba). That is because the standard device file names offer no information indicating that they all point to the same LUN.

The invention having been thus described the invention may be varied in many ways. For example, the method and apparatus of the present invention may be implemented in storage area networks (SANs) that use a Fibre Channel (FC) medium for the underlying network transport and, at the upper driver layer, move data to and from disks with serial SCSI protocol, as described in the current draft SCSI Primary Commands-3 (SPC-3) document.

Additionally, the functional blocks in FIGS. 1–5 may be implemented in hardware and/or software. The hardware/software implementation may include a combination of processors, application service providers, application specific integrated circuits (ASICs) and/or articles of manufacture. The articles of manufacture may further include storage media and executable computer program. The executable computer program may include the instructions to perform the described operations. For example, the computer program may be a product that includes a computer-readable medium having computer program logic stored thereon for enabling a processor of the product to identify multiple paths to a scsi device. The computer executable program may also be provided as part of externally supplied propagated signals. Such variations are not to be regarded as a departure from the spirit and scope of the invention, and all such modifications as would be obvious to one skilled in the art to be included within the scope of the following claims.

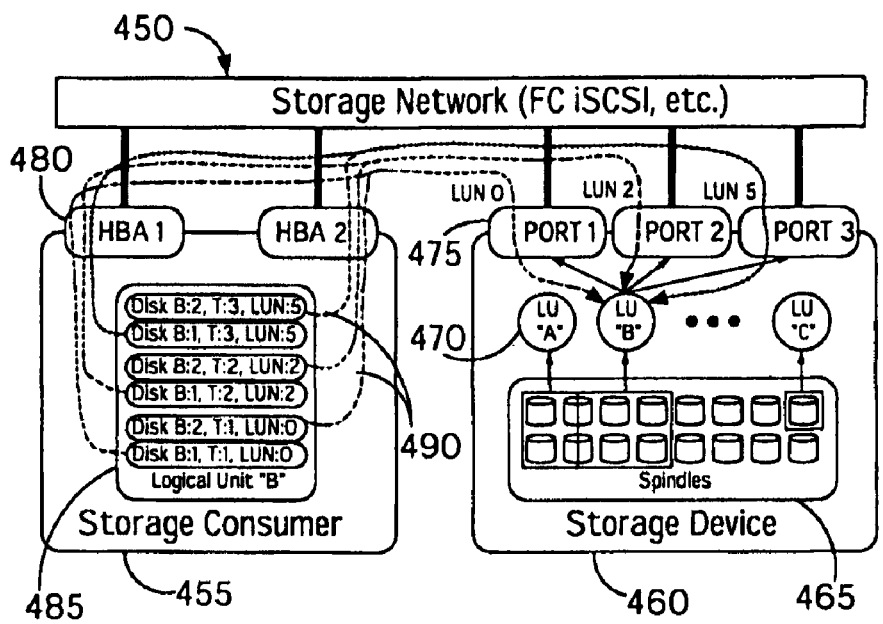

What is claimed:

1. A method for identifying multiple paths from a host to a small computer system interface (SCSI) device, comprising the steps of:
    querying for one or more logical unit numbers (LUNs) pertaining to the SCSI device, each LUN representing a potential path from the host to the SCSI device;
    treating response data indicative of multiple LUNs to the SCSI device as separate instances of independent SCSI devices, each separate, instance representing a different SCSI device structure;
    calculating a unique identifier (UID) for each SCSI device structure; and
    generating at least one device file based on the one or more UIDs, respectively, each device file containing UID and path information that differentiates between multiple paths from the host to the SCSI device.

2. The method of claim 1, wherein the path information includes a <host, bus, target, LUN> address of a particular path to the SCSI device.

3. The method of claim 1, wherein the querying step includes issuing one or more SCSI commands.

4. The method of claim 1, further comprising:
    mapping each calculated UID to the SCSI device structure.

5. The method of claim 4, further comprising:
    adding the SCSI device structure to a list of other SCSI device structures that map to the same UID.

6. The method of claim 1, further comprising:
    storing the device file by its device file name in one of a plurality of directories containing device file names for different types of SCSI devices.

7. The method of claim 1, wherein the host can distinguish between each multiple path to the same SCSI device by the device file name, thereby providing a fault tolerance capability for the host.

8. An apparatus for identifying multiple paths from a host from a host to a small computer system interface (SCSI) device, comprising:
    means for querying the SCSI device to determine if there are one or more logical unit numbers (LUNs) pertaining to the SCSI device, each LUN representing a potential path from the host to the SCSI device;
    means for treating responses containing data indicative of multiple LUNs as separate instances of independent SCSI devices, each separate instance representing a different SCSI device structure that pertains to the SCSI device;

means for calculating a unique identifier (UID) for each SCSI device structure; and means for generating at least one device file based on the one or more UIDs, respectively, each device file containing UID and path information that differentiates between multiple paths to the same SCSI device.

9. The apparatus of claim 8, wherein the path information is path information having a <host, bus, target , LUN> encoded-address of a particular path from the host to the SCSI device.

10. The apparatus of claim 9, further comprising means for mapping each calculated UID to the SCSI device structure.

11. The apparatus of claim 10, further comprising means for adding the SCSI device structure to a list of other SCSI device structures that map to the same UID.

12. The apparatus of claim 9, further comprising means for storing the device file by a device file name in memory.

13. The apparatus of claim 12, wherein the means for storing further includes a plurality of directories containing device file names for different SCSI devices.

14. The apparatus of claim 13, wherein one of the directories stores generated device files for disk drivers, the device file name being in a format <COMPRESSED_UID>-<PATH_NO>-<PARTITION_NO>, where COMPRESSED_UID represents a UID-based SCSI device name, PATH_NO differentiates between multiple paths to the single SCSI device, and PARTITION_NO is a specific partition on the disk.

15. The apparatus of claim 13, wherein one of the directories stores generated device files for tape drivers, the device file name being in a format <COMPRESSED_UID>-<PATH_NO>-<SCSI DEVICE_CHARACTERISTICS>, where COMPRESSED_UID represents a UID-based SCSI device name, PATH_NO differentiates between multiple paths to the single SCSI device, and SCSI DEVICE_CHARACTERISTICS pertains to characteristics of a tape LUN.

16. The apparatus of claim 13, wherein one of the directories stores generated device files for generic drivers, the device file name being in a format <COMPRESSED_UID>-<PATH_NO>, where COMPRESSED_UID represents a UID-based SCSI device name, and PATH_NO differentiates between multiple paths to the single SCSI device.

17. The apparatus of claim 8, wherein the SCSI device is a logical unit contained within a SCSI device that is connected to one or more of a SCSI bus and a fibre channel bus.

18. The apparatus of claim 8, wherein the host can distinguish between each multiple paths to the same SCSI device by the device file name, thereby providing a fault tolerance capability for the host.

19. The method of claim 1, wherein each SCSI device structure is a SCSI device pointer type of structure.

20. The method of claim 1, wherein:

there is a multi-level driver architecture that includes an upper level type of device driver and one or more lesser level types of device drivers; and the method further comprises the following, providing a filter driver, and intercepting, before the calculating & generating steps and via the filter driver, a first call to a given upper level device driver from a given one of the lesser device drivers regarding the SCSI device.

21. The method of claim 20, further comprising:

making, via the filter driver, a second call to the given upper level driver that represents the substance of the first call; and returning, via the filter driver, results to the given one of the lesser device drivers based upon results obtained according to the second call.

22. The method of claim 20, wherein:

the given one of the lesser drivers is a mid-level type of driver.

23. The method of claim 20, wherein:

the UID for each SCSI device structure is based upon information included therein, respectively.

24. The apparatus of claim 8, wherein each SCSI device structure is a SCSI device pointer type of structure.

25. The apparatus of claim 8, wherein:

there is a multi-level driver architecture that includes an upper level type of device driver and one or more lesser level types of device drivers; and the apparatus further comprises the following, filter driver means for intercepting, before the UID calculation and the device file generation, a first call to a given upper level device driver from a given one of the lesser device drivers regarding the SCSI device.

26. The apparatus of claim 25, wherein the filter driver means is further operable for doing the following:

making a second call to the given upper level driver that represents the substance of the first call; and returning results to the given one of the lesser device drivers based upon results obtained according to the second call.

27. The apparatus of claim 26, wherein:

the given one of the lesser drivers is a mid-level type of driver.

28. The apparatus of claim 20, wherein the means for calculating further is operable for calculating the UID for each SCSI device structure based upon information included therein, respectively.

* * * * *

UNITED STATES PATENT AND TRADEMARK OFFICE
CERTIFICATE OF CORRECTION

PATENT NO.       : 7,069,354 B2
APPLICATION NO.  : 10/260436
DATED            : June 27, 2006
INVENTOR(S)      : Subramaniyam Pooni et al.

It is certified that error appears in the above-identified patent and that said Letters Patent is hereby corrected as shown below:

Delete title page showing an illustrative figure and substitute therefor the attached title page Title Page, Abstract, 7th line:
After SCSI, delete "separate instances of independent SCSI devices, with each separate instance representing a different SCSI"

In the drawings delete drawing sheet(s) 3/4 and substitute therefore the drawing sheet(s) consisting of Fig(s) 3-4 as shown on the attached page Column 4, line 63:
Delete "Subsyteem" and insert --Subsystem--

Column 5, line 34:
After "the" delete ","

Column 6, line 66:
Delete "scsi13" and insert --scsi_--

Column 7, line 7:
Delete "UIDs" and insert --ULDs--

Column 7, line 12:
Delete "UID" and insert --ULD--

Column 10, line 48:
Delete "a" and insert --as--

Column 11, line 60:
After "114", delete "—"

Column 11, line 65:
Delete "scsi_device-templates" and insert --scsi_device_templates--

Column 11, line 67:
Delete "diver" and insert --driver--

CERTIFICATE OF CORRECTION (continued)
U.S. Pat. No. 7,069,354 B2

Column 12, line 37:
Delete "called"

Column 13, lines 30-40 and Column 13, lines 63-Column 14, lines 1-3:
These paragraphs should be switched Column 14, line 37:
Delete the second "device file"

Column 14, line 52:
Delete "know" and insert --known--

Column 16, line 16:
Delete "scsi" and insert --SCSI--

Column 16, line 20:
After "art" insert --are intended--

Column 16, line 32, Claim 1:
After "separate" delete ","

Column 17, line 36, Claim 15:
After "format" insert --[n]--

Signed and Sealed this

Sixteenth Day of March, 2010

David J. Kappos
*Director of the United States Patent and Trademark Office*

(12) United States Patent
Pooni et al.

(10) Patent No.: US 7,069,354 B2
(45) Date of Patent: Jun. 27, 2006

(54) METHOD AND APPARATUS FOR IDENTIFYING MULTIPLE PATHS TO A SCSI DEVICE USING A CALCULATED UNIQUE IDENTIFIER

(75) Inventors: Subramaniyam Pooni, Ventura, CA (US); Rajkumar Mangalore, Bangalore (IN); Vijay Srinath, Bangalore (IN); Vikram Krishnamurthy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 10/260,436

(22) Filed: Oct. 1, 2002

(65) Prior Publication Data

US 2004/0064594 A1    Apr. 1, 2004

(51) Int. Cl.
*G06F 3/00* (2006.01)
*G06F 13/00* (2006.01)
(52) U.S. Cl. .............. 710/38; 710/1; 710/9; 710/33; 710/72; 710/74; 710/301; 710/316; 714/2; 709/201; 709/203
(58) Field of Classification Search ............. 710/1, 710/33, 38, 72, 74, 301, 316, 9; 714/2; 709/201, 709/203

See application file for complete search history.

(56) References Cited

U.S. PATENT DOCUMENTS

| | | | |
|---|---|---|---|
| 6,779,064 B1 * | 8/2004 | McGowen et al. | 710/104 |
| 2003/0177168 A1 * | 9/2003 | Heitman et al. | 709/201 |
| 2003/0200477 A1 * | 10/2003 | Ayres | 714/2 |

* cited by examiner

*Primary Examiner*—Tammara Peyton

(57) ABSTRACT

The method includes querying for one or more logical unit numbers (LUNs) pertaining to a small computer system interface device, each LUN representing a potential path from a host to the SCSI device. Response data indicative of multiple LUNs to the single SCSI device is treated as separate instances of independent SCSI devices, with each separate instance representing a different SCSI separate instances of independent SCSI devices, with each separate instance representing a different SCSI device structure. A unique identifier (UID) is calculated for each SCSI device structure, from which a device file is generated based on the UID and contains UID and path information that differentiates between multiple paths from the host to the SCSI device.

28 Claims, 4 Drawing Sheets